United States Patent
Kalwitz et al.

(10) Patent No.: US 7,673,185 B2
(45) Date of Patent: Mar. 2, 2010

(54) ADAPTIVE SAS PHY CONFIGURATION

(75) Inventors: George Alexander Kalwitz, Mead, CO (US); James Boyd Lenehan, Erie, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 406 days.

(21) Appl. No.: 11/847,229

(22) Filed: Aug. 29, 2007

(65) Prior Publication Data

US 2007/0294572 A1    Dec. 20, 2007

Related U.S. Application Data

(63) Continuation-in-part of application No. 11/552,140, filed on Oct. 23, 2006, now Pat. No. 7,536,584.

(60) Provisional application No. 60/804,267, filed on Jun. 8, 2006.

(51) Int. Cl.
*G06F 11/00* (2006.01)
(52) U.S. Cl. .................. 714/43; 714/4; 714/56
(58) Field of Classification Search .......... 714/4, 714/5, 25, 30, 31, 36, 43, 56
See application file for complete search history.

(56) References Cited

U.S. PATENT DOCUMENTS 6,078,979 A    6/2000 Li et al.
7,028,106 B2 *  4/2006 Foster et al. .................. 710/2
7,290,074 B2   10/2007 Asano et al.
7,334,075 B2 *  2/2008 Marushak et al. ........... 710/316

(Continued)

FOREIGN PATENT DOCUMENTS

EP    1610225    12/2005

(Continued)

OTHER PUBLICATIONS

"05-212r0 SAS-2 System design considerations." Compiled by Barry Olawsky and Rob Elliott, HP. http://www.t10.org/ftp/t10/document.05/05-212r0.pdf; downloaded May 30, 2007; presentation given on May 26, 2005.

(Continued)

*Primary Examiner*—Michael C Maskulinski
*Assistant Examiner*—Joseph D Manoskey
(74) *Attorney, Agent, or Firm*—Thomas J. Lavan; E. Alan Davis

(57) ABSTRACT

A SAS expander adaptively configures a Serial-Attached-SCSI (SAS) PHY to accommodate varying lengths of a cable coupling the PHY to a remote PHY. The expander (a) configures the SAS PHY with settings of an entry of a table of PHY configuration settings, each entry in the table having different PHY configuration setting values; (b) clears a counter; (c) operates the PHY to communicate with the remote PHY for a monitoring period, after configuring the PHY and clearing the counter; (d) increments the counter when the PHY detects a PHY event during the monitoring period, and otherwise decrements the counter; (e) repeats steps (c) and (d) unless the counter rises above a threshold; and (f) when the counter rises above the threshold, repeats steps (a) through (e), wherein step (a) is performed with the settings of a different entry of the table.

23 Claims, 12 Drawing Sheets

U.S. PATENT DOCUMENTS

| | | | |
|---|---|---|---|
| 7,356,728 B2 * | 4/2008 | Tawil et al. | 714/5 |
| 7,423,995 B1 | 9/2008 | Elliott et al. | |
| 7,519,854 B2 * | 4/2009 | Lucas et al. | 714/9 |
| 7,529,980 B2 * | 5/2009 | Henning et al. | 714/41 |
| 2005/0005062 A1 | 1/2005 | Liu et al. | |
| 2005/0071532 A1 | 3/2005 | Bakke et al. | |
| 2005/0193178 A1 * | 9/2005 | Voorhees et al. | 711/149 |
| 2006/0034358 A1 | 2/2006 | Okamura | |
| 2006/0061369 A1 | 3/2006 | Marks et al. | |
| 2006/0101171 A1 | 5/2006 | Grieff et al. | |
| 2007/0011373 A1 | 1/2007 | Marks et al. | |
| 2007/0061632 A1 | 3/2007 | Uddenberg et al. | |
| 2007/0061681 A1 | 3/2007 | Carmichael | |
| 2007/0070885 A1 | 3/2007 | Uddenberg et al. | |
| 2007/0087615 A1 | 4/2007 | Paulsen et al. | |
| 2007/0088978 A1 | 4/2007 | Lucas et al. | |
| 2007/0093124 A1 * | 4/2007 | Varney et al. | 439/499 |
| 2007/0100847 A1 | 5/2007 | Slutz et al. | |
| 2007/0220204 A1 | 9/2007 | Nakajima et al. | |
| 2008/0247420 A1 * | 10/2008 | Marks et al. | 370/475 |
| 2009/0030649 A1 * | 1/2009 | Cagno et al. | 702/158 |

FOREIGN PATENT DOCUMENTS

| | | |
|---|---|---|
| WO | WO02073903 | 9/2002 |
| WO | WO02098059 | 12/2002 |

OTHER PUBLICATIONS

"PM8398 SXP 36x3GSec 36 Port SAS Expander Hardware Specification." Advance Issue No. 1; Sep. 2005. PMC-Sierra, Inc. Document No. PMC-2051557, Issue 1.

* cited by examiner

*Fig. 9*

Adaptive PHY Configuration Setting Table  ⟵ 226

| | | | | |
|---|---|---|---|---|
| 0 | cable length range A 902 | RX equalization 904 | TX pre-emphasis 906 | TX voltage swing 908 |
| 1 | cable length range B 902 | RX equalization 904 | TX pre-emphasis 906 | TX voltage swing 908 |
| 2 | cable length range C 902 | RX equalization 904 | TX pre-emphasis 906 | TX voltage swing 908 |
| 3 | cable length range D 902 | RX equalization 904 | TX pre-emphasis 906 | TX voltage swing 908 | analog settings 912

*Fig. 10*

Adaptive PHY Configuration Counters and Indexes  ⟵ 228

| | |
|---|---|
| PHY 0 counter 1002 | PHY 0 table index 1004 |
| PHY 1 counter 1002 | PHY 1 table index 1004 |
| PHY 2 counter 1002 | PHY 2 table index 1004 |
| ⋮ | ⋮ |
| PHY N counter 1002 | PHY N table index 1004 |

*Fig. 11*

Adaptive PHY Configuration Thresholds  ⟵ 232

| | |
|---|---|
| egress PHY type threshold 1102 | ingress PHY type threshold 1104 |

Fig. 13

Example Operation

| period | PHY event? | counter |
|--------|-----------|---------|
| 0 | N | 0 |
| 1 | Y | 1 |
| 2 | Y | 2 |
| 3 | N | 1 |
| 4 | Y | 2 |
| 5 | Y | 3 |
| 6 | Y | 4 |
| 7 | Y | 1 |
| 8 | Y | 2 |
| 9 | Y | 3 |
| 10 | Y | 4 |
| 11 | N | 0 |
| 12 | N | 0 |
| 13 | N | 0 |
| 14 | Y | 1 |
| 15 | N | 0 |
| 16 | N | 0 |
| 17 | N | 0 |
| 18 | N | 0 |
| 19 | N | 0 |
| 20 | N | 0 |
| 21 | N | 0 |
| 22 | N | 0 |
| 23 | N | 0 |
| 24 | N | 0 |
| 25 | N | 0 |
| 26 | N | 0 |

← threshold reached: re-configure PHY with settings from different table entry and clear counter to zero (at period 6)

← threshold reached: re-configure PHY with settings from different table entry and clear counter to zero (at period 10)

ADAPTIVE SAS PHY CONFIGURATION

CROSS REFERENCE TO RELATED APPLICATIONS

This application is a continuation-in-part of application Ser. No. 11/552,140, filed Oct. 23, 2006, which claims priority to Provisional Application No. 60/804,267, filed Jun. 8, 2006, both of which are incorporated by reference herein in their entirety for all purposes, and which were owned or subject to an obligation of assignment to Dot Hill Systems Corporation at the time the invention claimed herein was made.

BACKGROUND OF THE INVENTION

Field of the Invention

The present invention relates in general to the field of high data availability storage controllers that connect to storage devices via the Serial Attached SCSI (SAS) standard, and particularly to SAS PHY configuration.

Serial-Attached-SCSI (SAS) systems are becoming more and more common in modern computer systems. SAS systems include SAS initiator devices and SAS target devices as does its parent, the Small Computer Systems Interface (SCSI). SAS target devices are typically storage devices, such as disk drives, that receive commands from SAS initiator devices, such as SAS host bus adapters in host computers or SAS I/O controllers in Redundant Arrays of Inexpensive Disks (RAID) controllers.

Implementations and uses of SAS are described in detail in the following documents, each of which is incorporated by reference in its entirety for all intents and purposes:

"Serial Attached SCSI-1.1 (SAS-1.1)", Revision 10, Sep. 21, 2005. Working Draft, Project T10/1601-D, Reference number ISO/IEC 14776-151:200x. American National Standard Institute. (http://www.t10.org/ftp/t10/drafts/sas1/sas1r10.pdf)

"Serial Attached SCSI-2 (SAS-2)", Revision 6, Sep. 22, 2006. Working Draft, Project T10/1760-D, Reference number ISO/IEC 14776-152:200x. American National Standard Institute. (http://www.t10.org/ftp/t10/drafts/sas2/sas2r06.pdf)

"Serial Attached SCSI-2 (SAS-2)", Revision 10, May 15, 2007. Working Draft, Project T10/1760-D, Reference number ISO/IEC 14776-152:200x. American National Standard Institute. (http://www.t10.org/ftp/t10/drafts/sas2/sas2r10.pdf)

SAS systems are built on point-to-point serial connections between SAS devices. Each point-to-point connection is referred to as a link, or lane, and the two endpoints are referred to as a PHY. A PHY contains a transmitter device (TX) and receiver device (RX) and electrically interfaces to a link to communicate with another PHY at the other end of the link. The link, or lane, includes two differential signal pairs, one in each direction. A SAS port includes one or more PHYs. A SAS port that has more than one PHY grouped together is referred to as a wide port, and the more than one links coupling the two wide ports are referred to as a wide link. Wide ports and links provide increased data transfer rates between SAS endpoints and enable multiple simultaneous connections to be open between a SAS initiator and multiple SAS targets.

The simplest SAS topology is a single SAS initiator having a SAS port that is connected by a single SAS link to a SAS port of a single SAS target. However, it is desirable in many applications, such as a high data availability RAID system, to enable one or more SAS initiators to communicate with multiple SAS target devices. In addition to initiators and targets, SAS includes a third type of device, expanders, which are employed in SAS systems to achieve more complex topologies. SAS expanders perform switch-like functions, such as routing, to enable SAS initiators and targets to communicate via the SAS point-to-point connections.

The present inventors have observed various problems in complex topology SAS systems when a component is marginal or goes bad, such as a SAS device that generates logical errors, improper PHY analog settings, a bad or marginal PHY, or a bad or marginal link, which may include bad or marginal cables, connectors, or printed circuit board assembly traces. Some of the manifestations of the faulty components include intermittent communication errors between SAS devices, complete loss of a SAS link, or failure of an entire SAS domain. Another manifestation is the inability for an initiator to see a SAS target in the topology due to intermittent failures that cause a SAS device to work sufficiently well to be allowed into the topology, but to be sufficiently faulty to prevent effective communication between SAS devices.

One method of dealing with these problems is an initiator-based solution. The initiator may attempt to identify the faulty component and send a command through the SAS domain to disable, or bypass, various PHYs in the domain in a trial-and-error approach until the initiator has isolated the problem. However, the present inventors have observed some failure scenarios which cannot be satisfactorily remedied by the initiator-based approach. For example, assume a component fails in an intermittent fashion, such as a marginal PHY, that causes a SAS expander to first detect that a SAS link is operating properly, to subsequently detect that the link is not operating properly, and to continue this sequence for a relatively long time. According to the SAS standard, the SAS expander is required to transmit a BROADCAST primitive on each of its SAS ports to notify other SAS devices of the change of status within the SAS domain. Each time a SAS initiator receives the BROADCAST primitive it is required to perform a SAS discover process to discover the device type, SAS address, and supported protocols of each SAS device in the SAS domain and to configure routing tables within the SAS expanders as needed. The SAS discover process can take a relatively large amount of time. If the SAS expander transmits BROADCAST primitives due to the operational to non-operational link transitions according to a period that is comparable to the SAS discover process time, then consequently the SAS initiator may be unable to effectively send commands though the SAS domain to identify and remedy the problem. Or, even if the initiator is successful in identifying and fixing the problem, the SAS domain may have been effectively unavailable for providing user data transfers for an unacceptable length of time.

Another potential problem in SAS systems is the fact that the SAS standard allows cables that connect SAS PHYs to be anywhere within a relatively large range of lengths. For example, the SAS specification allows for cable lengths up to eight meters. The length of the SAS cable may significantly impact the quality of the signals transceived on the SAS link between two SAS PHYs.

Therefore, what is needed is a solution to improve the data availability in SAS systems, which are subject to the foregoing problems.

BRIEF SUMMARY OF INVENTION

In one aspect, the present invention provides a Serial-Attached-SCSI (SAS) expander. The SAS expander includes a plurality of SAS PHYs, each for coupling to a SAS cable for communication with a respective remote PHY. The SAS expander also includes a memory, configured to store a counter associated with each of the plurality of PHYs and a table of PHY configuration settings. Each entry in the table has different PHY configuration setting values. The SAS expander also includes a microprocessor, coupled to the memory and to the plurality of PHYs, configured to, for each of the plurality of PHYs: (a) configure the PHY with settings of an entry of the table; (b) clear the counter associated with the PHY; (c) operate the PHY to communicate with the remote PHY for a monitoring period, after configuring the PHY and clearing the counter; (d) increment the counter when the PHY detects a PHY event during the monitoring period, and otherwise decrement the counter; (e) repeat steps (c) and (d) unless the counter rises above a threshold; and (f) when the counter rises above the threshold, repeat steps (a) through (e), wherein the microprocessor performs step (a) with the settings of a different entry of the table.

In another aspect, the present invention provides a method for adaptively configuring a Serial-Attached-SCSI (SAS) PHY to accommodate varying lengths of a cable coupling the PHY to a remote PHY. The method includes: (a) configuring the SAS PHY with settings of an entry of a table of PHY configuration settings, each entry in the table having different PHY configuration setting values; (b) clearing a counter; (c) operating the PHY to communicate with the remote PHY for a monitoring period, after the configuring the PHY and the clearing the counter; (d) incrementing the counter when the PHY detects a PHY event during the monitoring period, and otherwise decrementing the counter; (e) repeating steps (c) and (d) unless the counter rises above a threshold; and (f) when the counter rises above the threshold, repeating steps (a) through (e), wherein step (a) is performed with the settings of a different entry of the table.

In another aspect, the present invention provides a Serial-Attached-SCSI (SAS) expander. The SAS expander includes a wide SAS port for coupling to a SAS cable for communication with a remote wide SAS port. The wide SAS port comprises a plurality of SAS PHYs. The SAS expander also includes a memory that stores a plurality of different PHY configuration settings. The SAS expander also includes a microprocessor coupled to the memory and to the wide SAS port. The microprocessor monitors for faults during operation of the wide SAS port. The microprocessor also adaptively re-configures the plurality of SAS PHYs with a different one of the plurality of PHY configuration settings, in response to detecting that all of the plurality of SAS PHYs of the wide SAS port are experiencing the same type of fault. The microprocessor also disables one of the plurality of SAS PHYs of the wide SAS port, in response to detecting that only the one of the plurality of SAS PHYs is experiencing faults.

In another aspect, the present invention provides a method for improving the reliability of a Serial-Attached-SCSI (SAS) domain including a SAS expander having a wide SAS port comprising a plurality of SAS PHYs. The method includes monitoring for faults during operation of the wide SAS port. The method also includes adaptively re-configuring the plurality of SAS PHYs with new PHY configuration settings, in response to detecting that all of the plurality of SAS PHYs of the wide SAS port are experiencing the same type of fault. The method also includes disabling one of the plurality of SAS PHYs of the wide SAS port, in response to detecting that only the one of the plurality of SAS PHYs is experiencing faults. The monitoring, adaptively re-configuring, and disabling are all performed by the SAS expander.

Advantageously, in addition to resolving varying SAS cable length problems, adaptive PHY configuration embodiments described herein may also be useful in resolving other SAS link-related problems, such as varying manufacturing quality of SAS cables and/or PHY circuitry.

BRIEF DESCRIPTION OF THE DRAWINGS

FIG. 9 is a block diagram illustrating an adaptive PHY configuration setting table of FIG. 2 used to perform adaptive PHY configuration according to the present invention.

FIG. 10 is a block diagram illustrating adaptive PHY configuration counters of FIG. 2 used to perform adaptive PHY configuration according to the present invention.

FIG. 11 is a block diagram illustrating adaptive PHY configuration thresholds of FIG. 2 used to perform adaptive PHY configuration according to the present invention.

FIG. 13 is a table illustrating an example of operation of adaptive PHY configuration according to the present invention.

DETAILED DESCRIPTION

Figure 1:
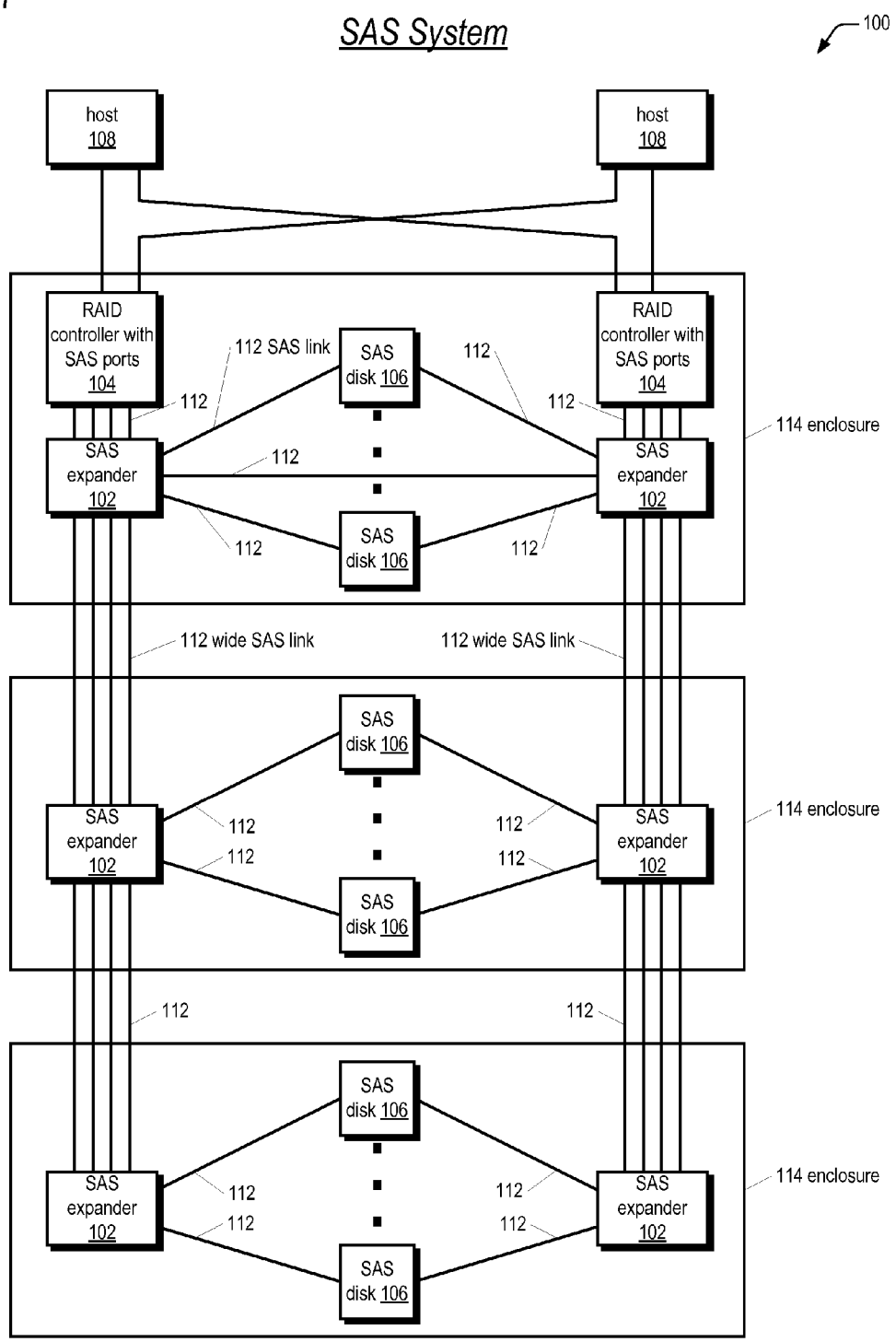
FIG. 1 is a block diagram of a SAS system according to the present invention.

Referring now to FIG. 1, a block diagram of a SAS system 100 according to the present invention is shown. The SAS system 100 includes two host computers 108 each coupled to two SAS-based RAID controllers 104, via a host interconnect such as Ethernet, FibreChannel, or the like. Each RAID controller 104 is coupled to a corresponding SAS expander 102 via a wide SAS link 112. In the embodiment of FIG. 1, the wide SAS links 112 between the RAID controllers 104 and the SAS expanders 102 are 4× wide. Each of the SAS expanders 102 is coupled to a plurality of SAS disks 106 via a corresponding SAS link 112. In the embodiment of FIG. 1, the SAS links 112 between the SAS expanders 102 and the SAS disks 106 are narrow (i.e., 1×) SAS links 112. The RAID controllers 104, SAS expanders 102, and SAS disks 106 are enclosed in an enclosure 114. Additionally, the SAS expanders 102 within the enclosure 114 are connected via a SAS link 112. In one embodiment, the inter-expander SAS link 112 is a 4× wide link. The inter-expander SAS link 112 advantageously provides a second SAS pathway for each RAID controller 104 to communicate with each of the SAS disks 106 through the SAS expander 102 that is directly connected to the other RAID controller 104.

Advantageously, the SAS expanders 102 of the SAS system 100 are intelligent SAS expanders 102 that include the ability to identify faulty communications on a SAS link 112 connected to one of the SAS expander 102 PHYs. Furthermore, the intelligent SAS expanders 102 include the ability to disable the identified PHY to isolate the faulty component, which may be the PHY itself, from the rest of the SAS system 100. Additionally, the intelligent SAS expanders 102 include the ability to report the disabled PHY. Still further, the intelligent SAS expanders 102 include the ability to recover from faulty condition. In one embodiment, a user notifies the SAS expander 102 that corrective action has been taken, such as replacing the faulty component (e.g., faulty cable, faulty SAS disk 106, or other faulty component), and the SAS expander 102 responsively repairs the communication between the SAS expander 102 and the other device by re-enabling the previously disabled PHY. In one embodiment, the SAS expander 102 is intelligent enough to automatically detect that a user has remedied the fault, and responsively re-enables the PHY. In one embodiment, the SAS expander 102 is intelligent enough to automatically take action to remedy the fault, such as by adjusting the PHY analog settings (shown in FIG. 9) until reliable communications are restored. The SAS expander 102 includes a microprocessor that monitors status registers associated with the PHYs to identify faulty communications on a SAS link 112, writes to control registers to disable and re-enable the PHYs, and performs the reporting function, as discussed in detail below.

Further advantageously, the intelligent SAS expanders 102 include the ability to automatically re-configure the analog settings (shown in FIG. 9) of one or more of their PHYs based on a history of PHY events in order to accommodate varying SAS cable lengths. The SAS expander 102 automatically re-configures the PHY on each attempt with settings from a table of entries with different settings. The settings for each entry in the table have been determined to be optimal for different cable length ranges. The automatic reconfiguring enables the PHY to adapt to different lengths or qualities of cables connecting the expander 102 PHY to a remote PHY.

The SAS system 100 of FIG. 1 also includes second and third enclosures 114 similar to the first enclosure 114 described above; however, the second and third enclosures 114 do not include the RAID controllers 104, and are employed for enclosing only SAS disks 106 and two SAS expanders 102. Each SAS expander 102 in the first enclosure 114 is linked to a corresponding one of the SAS expanders 102 in the second enclosure 114 via a corresponding wide SAS link 112. Similarly, each SAS expander 102 in the second enclosure 114 is linked to a corresponding one of the SAS expanders 102 in the third enclosure 114 via a corresponding wide SAS link 112. In one embodiment, each enclosure 114 may enclose up to 12 SAS disks 106, in addition to the RAID controllers 104, SAS expanders 102, power supplies, cooling systems, management controllers, and other components as are well known in the storage system industry. The PHYs of the SAS expanders 102 in the enclosures 114 are connected by one or more SAS cables. In embodiments in which the link 112 between the enclosures 114 is a wide link 112, typically a single cable encloses all of the differential signal pairs of the wide link 112.

Advantageously, the SAS system 100 of FIG. 1 is arranged in a redundant manner to increase fault-tolerance of the SAS system 100. In particular, each SAS disk 106 is accessible by each of the RAID controllers 104 so that if a RAID controller 104, SAS link 112, or SAS expander 102 fails, the hosts 108 may continue to access the SAS disks 106 via a surviving RAID controller 104 or SAS pathway. The SAS system 100 of FIG. 1 is intended as an example of a SAS system 100 in which the present invention may be employed. However, the present invention is not limited to the system configuration shown in FIG. 1. Rather, the present invention may be employed in various SAS topologies that include SAS expanders. In some embodiments, the hosts 108 may also be included in the first enclosure 114.

As mentioned above, the SAS links 112 may include various components, such as cables, connectors, and printed circuit board assemblies that include signal conductors. In one embodiment, the SAS expander 102 comprises a PM8388 SXP 24×3G 24-port SAS expander available from PMC-Sierra, Inc., of Santa Clara, Calif., in which the present inventors have modified the code 222 (discussed below) to perform the fault identification, isolation, reporting, repairing, and adaptive PHY configuration steps described herein. In other embodiments, the SAS expander 102 comprises a modified version of the following PMC-Sierra models: PM8387 SXP 36×3G 36-port SAS expander, PM8399 SXP 24×3GSEC 24-port SAS expander, or PM8398 SXP 36×3GSEC 24-port SAS expander.

Although FIG. 1 illustrates a SAS system 100 including SAS disks 106, the present invention may be employed in a SAS system 100 including SATA disks 106, which are interoperable with SAS disks within a SAS domain. In particular, the SATA Tunneled Protocol (STP) provides a means for SAS/SATA initiators to communicate with SATA disks over the SAS hardware infrastructure.

Figure 2:
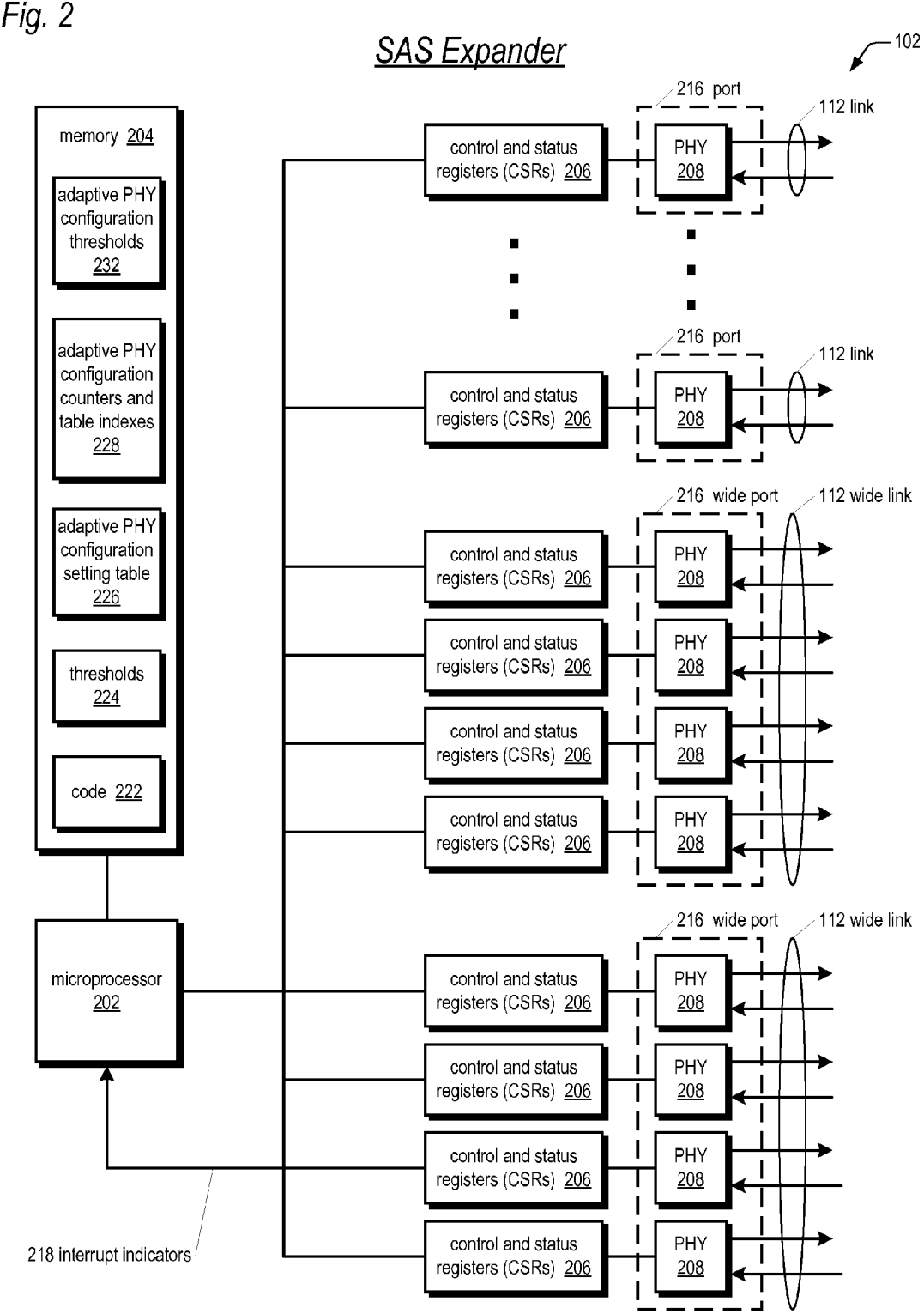
FIG. 2 is a block diagram illustrating in more detail the SAS expander of FIG. 1 according to the present invention.

Referring now to FIG. 2, a block diagram illustrating in more detail the SAS expander 102 of FIG. 1 according to the present invention is shown. The SAS expander 102 includes a microprocessor 202 coupled to a memory 204 and a plurality of SAS ports 216. The memory 204 stores code 222 instructions that are fetched and executed by the microprocessor 202 to accomplish the fault identification, isolation, reporting, repairing, and adaptive PHY configuration steps described herein. The memory 204 also stores threshold values 224 which the microprocessor 202 compares with counter values 392 (described below with respect to FIG. 3) to detect faulty communications, as discussed below. The memory 204 also stores an analog setting table 226, counters 228, and thresholds 232 (described below with respect to FIGS. 9, 10, and 11, respectively) used to perform the adaptive PHY configuration described herein.

Each SAS port 216 includes one or more SAS PHYs 208 connected to one of the SAS links 112 of FIG. 1. The links 112 may be included in SAS cables. As shown, some of the SAS ports 216 are wide SAS ports 216 and some are narrow SAS ports 216. Each SAS port 216 also includes a SAS SERDES circuit (not shown).

The SAS expander 102 also includes a set of control and status registers (CSRs) 206 associated with each PHY 208, which the microprocessor 202 reads and writes to monitor fault detection parameters 300 (described below with respect to FIG. 3) and to control the PHYs 208, such as to disable and enable the PHYs 208 and to perform adaptive PHY configuration. The fault detection parameters 300 and their use are described in more detail below with respect to the remaining Figures. In addition, the fault detection parameters 300 include interrupt indicators 218 from the PHYs 208 that are provided to notify the microprocessor 202 of events related to communication on the SAS links 112.

The SAS expander 102 also includes multiplexed data paths (such as a crossbar) and switching circuitry (not shown) that interconnect the various PHYs 208 to enable them to transfer commands and data from one PHY 208 to another to perform the switching function of the SAS expander 102. The SAS expander 102 may also include buffering circuits associated with each of the PHYs 208 for buffering the commands and data when received in a port 216 and when waiting to be transmitted out a port 216. The commands and data are routed through the network between the ports 216 based on routing table information, which in one embodiment is stored in the memory 204.

Figure 3:
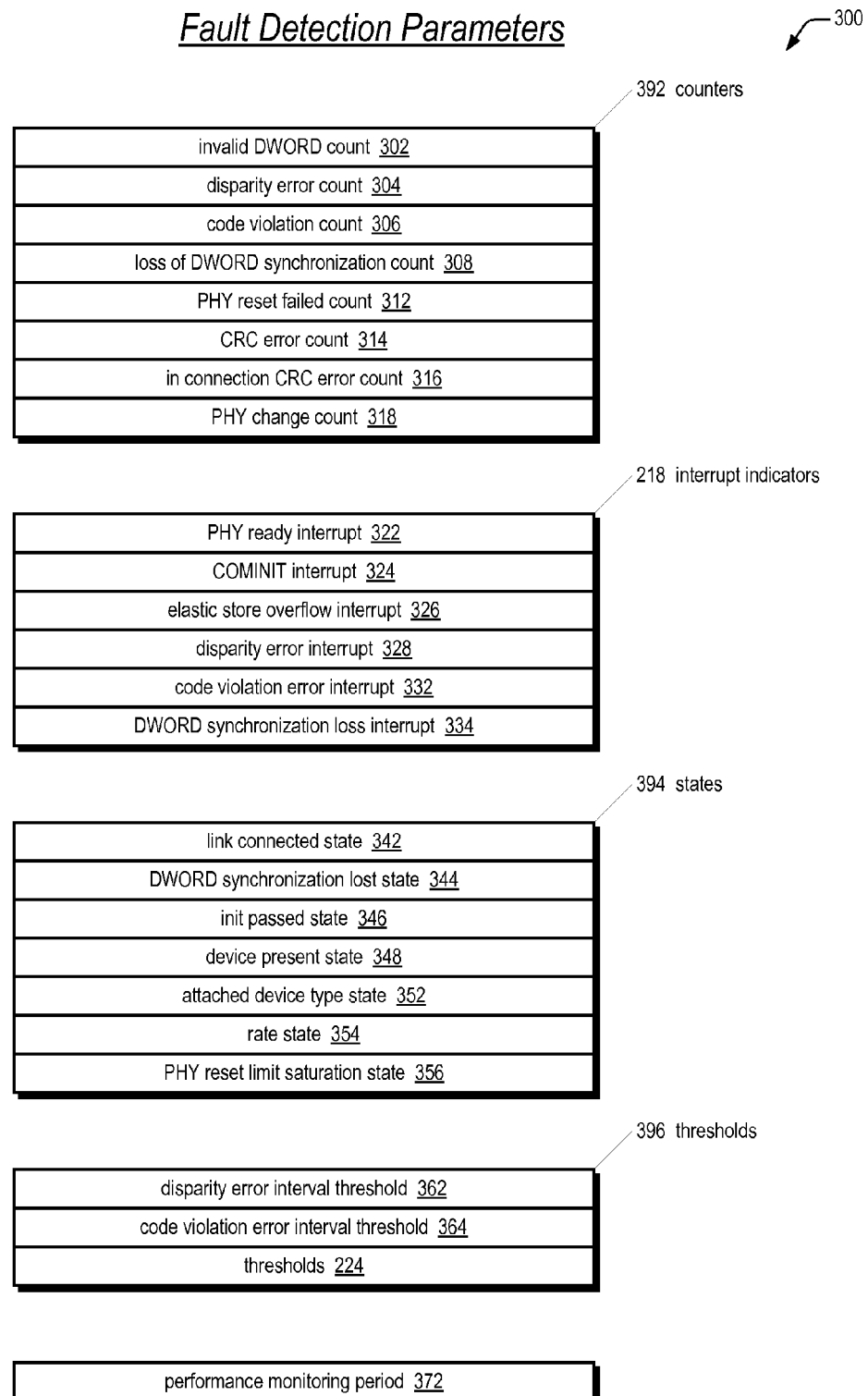
FIG. 3 is a block diagram illustrating fault detection parameters according to the present invention.

Referring now to FIG. 3, a block diagram illustrating fault detection parameters 300 according to the present invention is shown. The fault detection parameters 300 include the interrupt indicators 218, values stored in the CSRs 206, and values stored in the memory 204 of FIG. 2. The fault detection parameters 300 may be categorized generally as counters 392, interrupt indicators 218, states 394, thresholds 396 stored in the CSRs 206 and the thresholds 224 stored in the memory 204 of FIG. 2. The fault detection parameters 300 also include a performance monitoring period 372 stored in a CSR 206, whose use is described below. In one embodiment, the monitoring period 372 is 100 milliseconds; however, embodiments are contemplated in which different monitoring period values 372 are used.

The microprocessor 202 maintains a corresponding threshold 396 for each of the counters 392. Some of the thresholds 396 are stored in the CSRs 206, namely the disparity error interval threshold 362 and the code violation error interval threshold 364, and the SAS expander 102 hardware automatically compares them with the corresponding counter 392 value and generates an interrupt if the threshold is exceeded. The thresholds 224 corresponding to the other counter 392 values are stored in the memory 204, and the microprocessor 202 periodically compares the counter 392 values, or accumulated counts derived from the periodically sampled counter 392 values, with the thresholds 224 to identify faulty communications on the SAS links 112.

The counters 392 include an invalid DWORD count 302, which indicates the number of invalid DWORDs received outside PHY reset sequences; a disparity error count 304, which indicates the number of running disparity errors received outside PHY reset sequences; a code violation count 306, which indicates the number of times a decode error was detected on a bit stream; a loss of DWORD synchronization count 308, which indicates the number of times the PHY 208 has restarted the link reset sequence because it lost dword synchronization (i.e., the number of times the PHY 208 went from PHY ready state to COMINIT state); a PHY reset failed count 312, which indicates the number of times the PHY 208 has failed to obtain dword synchronization during final SAS speed negotiation; a CRC error count 314, which indicates the number of CRC DWORD errors detected for received IDENTIFY and OPEN address frames; an in connection CRC error count 316, which indicates the number of in connection CRC errors; and a PHY change count 318, which indicates the number of PHY change events that have been generated.

The interrupt indicators 218 include a PHY ready interrupt 322, which indicates the PHY 208 has finished initialization and is ready to transmit and receive data (A PHY 208 becomes ready only after COMINIT has been detected); a COMINIT interrupt 324, which indicates a valid COMINIT out of band (OOB) sequence has been successfully negotiated; a elastic store overflow interrupt 326, which indicates a valid DWORD was received and the internal elastic store, or buffer, is full; a disparity error interrupt 328, which indicates the disparity error interval threshold 362 has been exceeded during the number of clock cycles specified in the performance monitoring period 372; a code violation error interrupt 332, which indicates the code violation error interval threshold 364 has been exceeded during the number of clock cycles specified in the performance monitoring period 372; a DWORD synchronization loss interrupt 334, which indicates DWORD synchronization on the PHY 208 was lost and consequently the PHY 208 has restarted the link reset sequence.

The states 394 include a link connected state 342, which indicates whether the port 216 is in a connected state; a DWORD synchronization lost state 344, which indicates the PHY 208 has currently lost DWORD synchronization; an init passed state 346, which indicates whether the port 216 has successfully completed the link initialization sequence; a device present state 348, which indicates whether a device is connected to the PHY 208; an attached device type state 352, which indicates whether a SAS or SATA device was detected as being connected; a rate state 354, which indicates whether the final negotiated line rate is 1.5 or 3.0 Gbits/sec; a PHY reset limit saturation state 356, which indicates that the PHY 208 reset threshold has been reached.

In one embodiment, the SAS expander 102 is configured to receive from the RAID controllers 104 SCSI Enclosure Services (SES) pages that set and get the various fault detection parameters 300, that get the status of the PHYs 208, and that directly enable or disable individual PHYs 208. In one embodiment, control and status information, such as SES pages, may be sent via an out-of-band communication path between the SAS expanders 102 within an enclosure 114, such as an I²C connection or other communication path. The out-of-band communication path may be advantageously employed if the SAS expander 102 has disabled all PHYs 208 connecting the SAS expander 102 to an upstream SAS expander 102, such as might occur if the SAS cable connecting them is faulty. The disabling SAS expander 102 may communicate to the other SAS expander 102 in the enclosure 114 status information indicating that it has disabled the PHYs 208. In this situation, to avoid rebooting, the user may cause the other SAS expander 102 in the enclosure 114 to broadcast an SES page via the out-of-band communication path to the PHY-disabled SAS expander 102 instructing the SAS expander 102 to re-enable the disabled PHYs 208 after the cable has been replaced. The out-of-band communication path is particularly useful for the SAS expanders 102 within an enclosure 114 that do not have an inter-expander SAS link 112, which may not be present because the SAS specification does not allow loops within the SAS topology. Furthermore, the SAS expander 102 includes default values of the fault detection parameters 300 that are stored in a non-volatile memory of the SAS expander 102 and that are employed at boot time of the SAS expander 102. The default values may be modified by the RAID controllers 104 or by the microprocessor 202 during operation.

Figure 4:
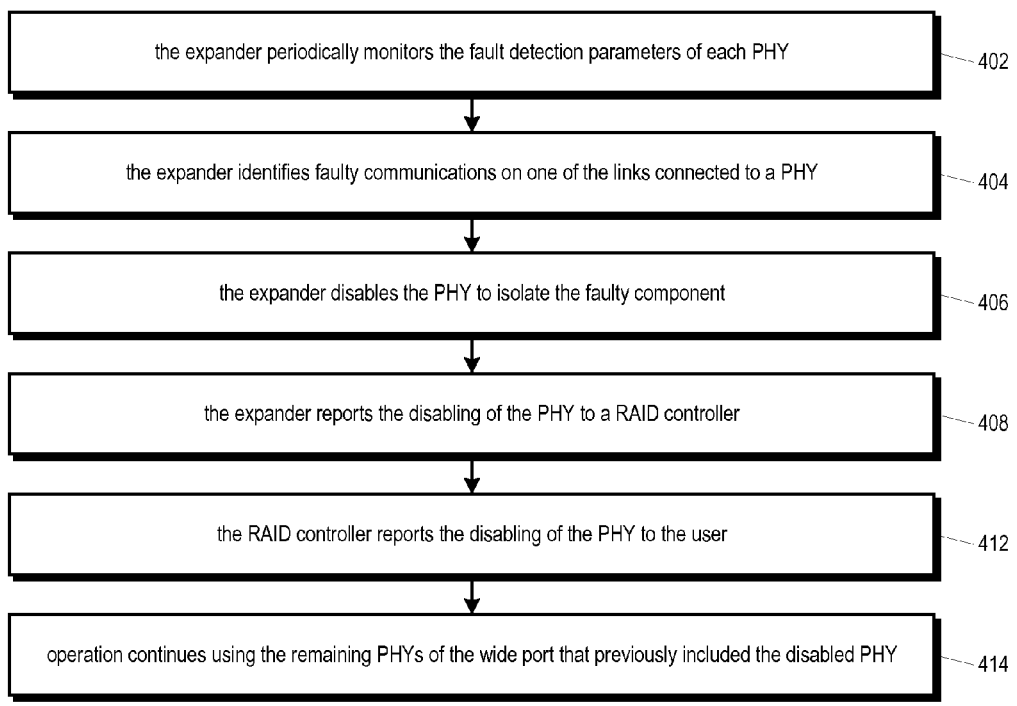
FIGS. 4 through 8 are flowcharts illustrating operation of various embodiments of the SAS system of FIG. 1.

Referring now to FIG. 4, a flowchart illustrating operation of the SAS system 100 of FIG. 1 is shown. Flow begins at block 402.

At block 402, the microprocessor 202 of FIG. 2 of the SAS expander 102 of FIG. 1 periodically monitors the fault detection parameters 300 of FIG. 3 of each of its PHYs 208 based on the performance monitoring period register 372 value of FIG. 3. The interrupt indicators 218 are polled by the microprocessor 202. In one embodiment, the interrupts indicators 218 are received asynchronously by the microprocessor 202 as interrupt request signals. In one embodiment, in response to monitoring the fault detection parameters 300, the microprocessor 202 also updates a database that it maintains for providing status information to the RAID controllers 104. In one embodiment, the status information is provided via SES pages. In one embodiment, in response to monitoring the fault detection parameters 300, the microprocessor 202 also maintains and updates accumulated error counts stored in the memory 204 over multiple monitoring periods, as described in more detail with respect to FIG. 12. In one embodiment, the monitoring period is determined by a timer interrupt to the microprocessor 202 whose period is specified in the monitoring period register 372. Flow proceeds to block 404.

At block 404, the microprocessor 202 identifies faulty communications on a SAS link 112 connected to one of its PHYs 208 based on the monitoring at block 402. The microprocessor 202 analyzes the fault detection parameters 300 according to isolation rules embodied in the code 222 for fault indications to determine whether there is a need to disable a PHY 208 or to adaptively configure a PHY 208. The identification of the faulty communications may include various criteria as discussed herein. An isolation rule may be triggered by one or more of the various counts exceeding a threshold, by detection that a PHY 208 has reached one or more particular states, that one or more particular events have occurred as indicated by one or more of the interrupt indicators 218, and various combinations thereof. In one embodiment, the microprocessor 202 only identifies faulty communications related to a PHY 208 if the PHY 208 is enabled. In one embodiment, the microprocessor 202 only identifies faulty communications related to a PHY 208 if isolation or adaptive configuration is allowed for the PHY 208. In one embodiment, the SAS expander 102 receives SES pages from the RAID controllers 104 to selectively enable and disable individual PHYs 208 and to selectively allow and disallow isolation or adaptive configuration of individual PHYs 208. Flow proceeds to block 406.

At block 406, the microprocessor 202 writes to a control register 206 to disable the PHY 208 identified at block 404. Flow proceeds to block 408.

At block 408, the SAS expander 102 reports the fact that the PHY 208 was disabled to one or both of the RAID controllers 104. In one embodiment, the SAS expander 102 also reports the reason the PHY 208 was disabled. In one embodiment, the SAS expander 102 also reports all threshold values used by the SAS expander 102 to make a determination to disable the PHY 208. In one embodiment, the SAS expander 102 reports by transmitting an SES diagnostic page to the RAID controller 104. In one embodiment, the SAS expander 102 reports by transmitting a Serial Management Protocol (SMP) message to the RAID controller 104. In one embodiment, the SAS expander 102 provides an interface to the RAID controllers 104 to enable the RAID controllers 104 to obtain the status of each PHY 208 and the current error counts, state, and events described herein. Flow proceeds to block 412.

At block 412, the RAID controller 104 reports that the PHY 208 was disabled to a user. In one embodiment, the RAID controller 104 reports to the user via a management interface. In one embodiment, the RAID controller 104 reports to the user by reporting to one or both of the hosts 108, which in turn notify the user. Flow proceeds to block 414.

At block 414, assuming the disabled PHY 208 is part of a wide port 216, communications between the SAS expander 102 port and the SAS device connected to the port 216 continue via the remaining PHYs 208 of the port 216 and associated SAS links 112 that are functioning properly. It is noted that the SAS system 100 may experience a proportionally lower data throughput due to the disabled PHY 208 and its respective SAS link 112. However, advantageously, by disabling the PHY 208 associated with the faulty SAS link 112 (or the PHY 208 itself may have been faulty), the likelihood that the SAS system 100 will continue functioning normally is increased, thereby improving the availability of the data on the SAS disks 106 to the hosts 108, rather than experiencing the various problems discussed herein. Flow ends at block 414.

Figure 5:
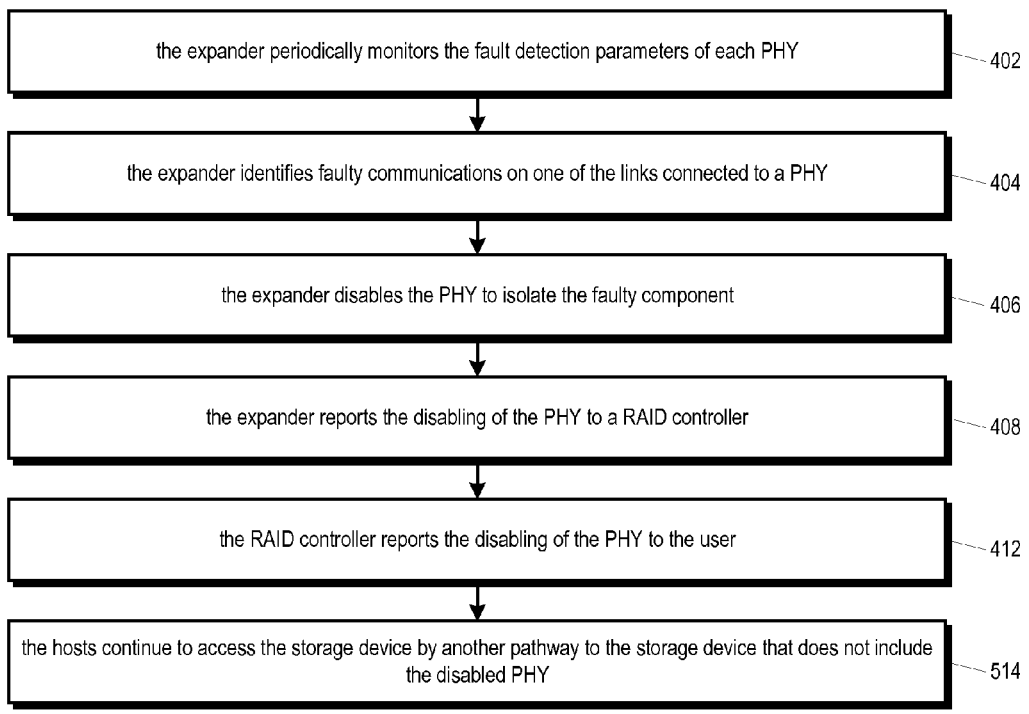

Referring now to FIG. 5, a flowchart illustrating operation of the SAS system 100 of FIG. 1 according to an alternate embodiment is shown. The operation of the SAS system 100 as described in FIG. 5 assumes that the disabled PHY 208 was part of a narrow port 216 (rather than a wide port 216 as assumed with respect to FIG. 4) such that communication between the SAS expander 102 and the SAS device that was connected to the PHY 208 that was disabled at block 406 is no longer possible via the narrow SAS link 112 between the SAS expander 102 and the SAS device. Additionally, FIG. 5 does not describe attempts to recover normal functioning of the faulty SAS link 112, such as is described with respect to FIGS. 6 through 8. In situations where recovery of normal functioning is performed, the SAS system 100 may continue to operate as described in FIG. 4 or 5 (depending upon whether the disabled PHY 208 was part of a wide or narrow port 216) until the recovery of normal functioning is achieved.

Flow begins at block 402. Blocks 402 through 412 of FIG. 5 are the same as like-numbered blocks of FIG. 4 and for the sake of brevity are not described again here. Flow proceeds from block 412 of FIG. 5 to block 514.

At block 514, the hosts 108 continue to access the SAS disks 106 implicated by the PHY 208 disabled at block 406 via an alternate pathway that does not include the disabled PHY 208. With respect to the SAS system 100 of FIG. 1, the hosts 108 will communicate with the SAS disks 106 via the other RAID controller 104. Flow ends at block 512.

Figure 6:
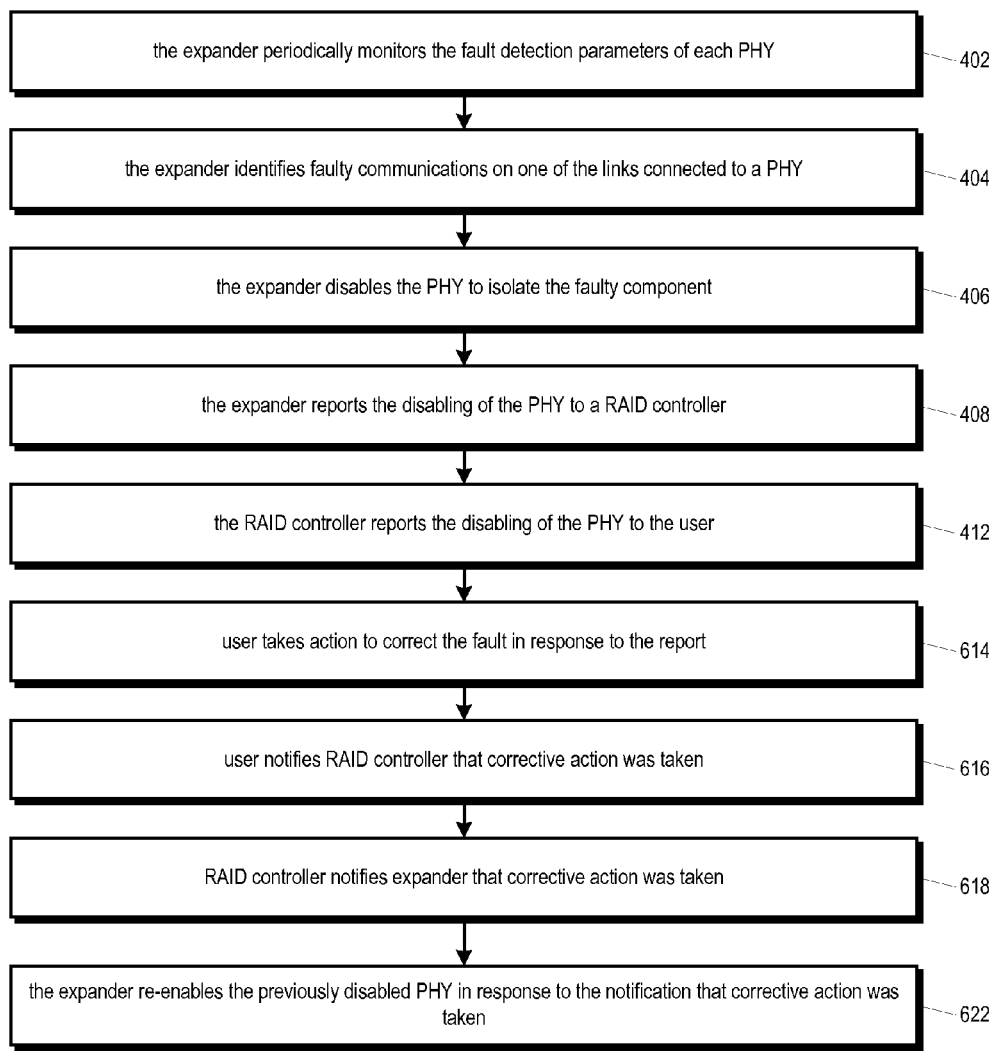

Referring now to FIG. 6, a flowchart illustrating operation of the SAS system 100 of FIG. 1 according to an alternate embodiment is shown. FIG. 6 describes operation of the SAS system 100 of FIG. 1 in which the SAS expander 102 additionally re-enables the previously disabled PHY 208 in response to user input that the fault has been corrected.

Flow begins at block 402. Blocks 402 through 412 of FIG. 6 are the same as like-numbered blocks of FIG. 4 and for the sake of brevity are not described again here. Flow proceeds from block 412 of FIG. 6 to block 614.

At block 614, the user takes action to correct the faulty component in response to the reporting of the disabled PHY 208 at block 412. Examples of action that the user may take to correct the faulty component include, but are not limited to, replacing a cable, replacing a connector, replacing a SAS disk 106, replacing a SAS expander 102, replacing a RAID controller 104, and reconfiguring a PHY 208, such as to adjust its analog settings (shown in FIG. 9). Flow proceeds to block 616.

At block 616, the user notifies one of the RAID controllers 104 that he has taken the corrective action at block 614. In one embodiment, the user notifies the RAID controller 104 via a management interface. In one embodiment, the user notifies one of the hosts 108, which in turn notifies the RAID controller 104. Flow proceeds to block 618.

At block 618, the RAID controller 104 notifies the SAS expander 102 that the corrective action was taken. In one embodiment, the SAS expander 102 is notified by receiving a SCSI Enclosure Services (SES) diagnostic page from the RAID controller 104. In one embodiment, the SAS expander 102 is notified by receiving a Serial Management Protocol (SMP) message from the RAID controller 104. In one embodiment, the RAID controller 104 notifies the SAS expander 102 by explicitly instructing the SAS expander 102 to re-enable the PHY 208. Flow proceeds to block 622.

At block 622, the microprocessor 202 writes to a control register 206 to re-enable the PHY 208 that was previously disabled at block 406, in response to the notification that the corrective action was taken. Flow ends at block 622.

In one embodiment, the microprocessor 202 foregoes disabling the PHY 208 at block 406 if the PHY 208 is linked to another SAS expander 102 that is downstream from a RAID controller 104 linked to the SAS expander 102 that detected the fault. This advantageously simplifies recovery of certain failure modes on a SAS topology involving cascaded SAS expanders 102, such as the SAS system 100 of FIG. 1. For example, assume a cable is faulty that connects a SAS expander 102 in each of two of the enclosures 114 of FIG. 1 and both of the SAS expanders 102 detect the fault and disable their respective PHYs 208. In this example, to recover operation of the SAS link 112 once the cable is replaced may require coordination between the two SAS expanders 102 and potentially between the two RAID controllers 104. In contrast, by foregoing disabling the PHY 208 at block 406 if the PHY 208 is linked to a downstream SAS expander 102, the requirement for coordination is avoided.

Figure 7:
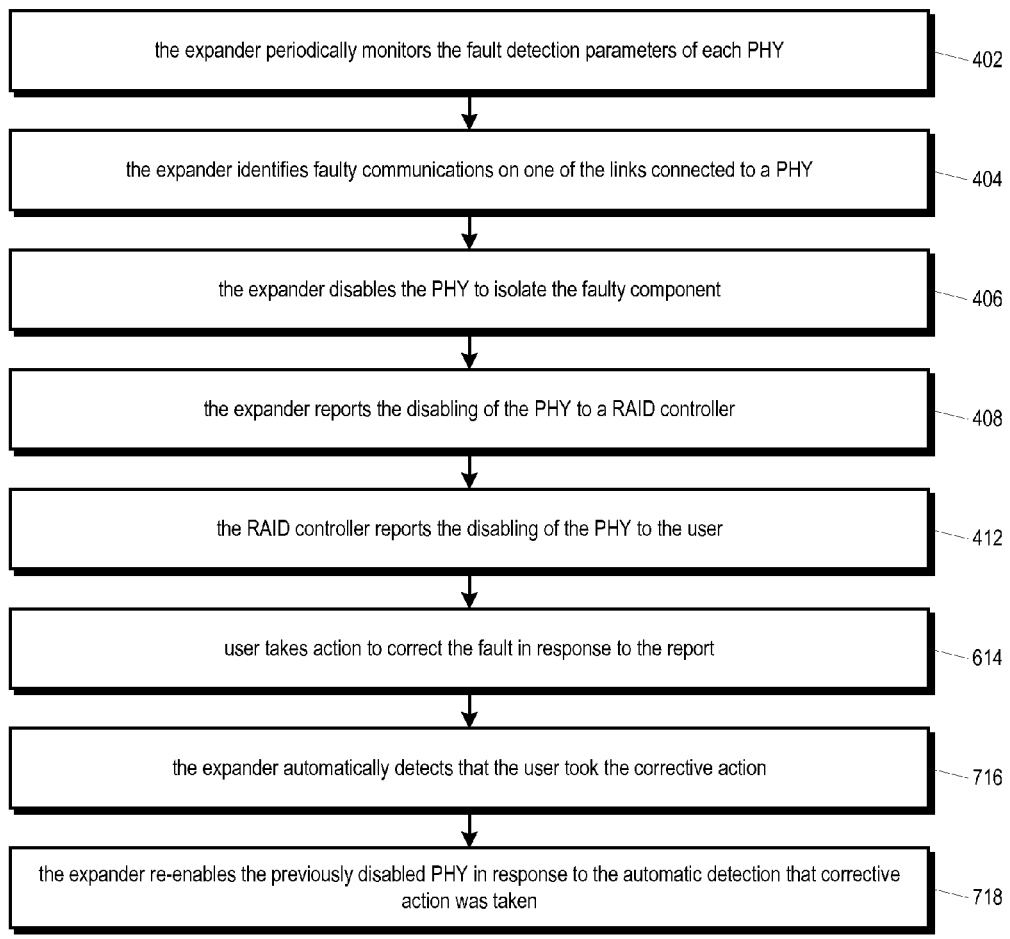

Referring now to FIG. 7, a flowchart illustrating operation of the SAS system 100 of FIG. 1 according to an alternate embodiment is shown. FIG. 7 describes operation of the SAS system 100 of FIG. 1 in which the SAS expander 102 additionally re-enables the previously disabled PHY 208 in response to automatically detecting that the fault has been corrected.

Flow begins at block 402. Blocks 402 through 412 and 614 of FIG. 7 are the same as like-numbered blocks of FIG. 6 and for the sake of brevity are not described again here. Flow proceeds from block 614 of FIG. 7 to block 716.

At block 716, the microprocessor 202 automatically detects that the user took the corrective action at block 614. In one embodiment, the user corrective action automatically detected by the microprocessor 202 is a user replacing a cable. The microprocessor 202 automatically detects the cable replacement by detecting a change of state from link not connected to link connected via the link connected state 342 fault detection parameter 300. In one embodiment, the user corrective action automatically detected by the microprocessor 202 is a user replacing a SAS disk 106 or a SATA disk. The microprocessor 202 automatically detects the disk replacement by detecting a change of state from device not present to device present via the device present state 348 fault detection parameter 300 and detects whether the replaced disk is a SAS disk or a SATA disk via the attached device type state 352. In one embodiment, the user corrective action automatically detected by the microprocessor 202 is a user replacing a SAS expander 102. The microprocessor 202 automatically detects the SAS expander 102 replacement by detecting a change of state from device not present to device present via the device present state 348 fault detection parameter 300 of a PHY 208 connected to the replaced SAS expander 102 via the inter-expander SAS link 112 of FIG. 1 or via receiving status on the out-of-band communication path discussed above with respect to FIG. 3. In one embodiment, the user corrective action automatically detected by the microprocessor 202 is a user replacing a RAID controller 104. The microprocessor 202 automatically detects the RAID controller 104 replacement by detecting a change of state from device not present to device present via the device present state 348 fault detection parameter 300 of a PHY 208 connecting the SAS expander 102 to the replaced RAID controller 104. The above are provided as examples of automatically detected user corrective action performed by the microprocessor 202; however, embodiments are not limited to those described above, but may be employed for other user corrective action. The user corrective action, such as a cable replacement, may cause the SAS expander 102 to perform adaptive PHY configuration, as described with respect to FIGS. 9 through 14. Flow proceeds to block 718.

At block 718, the microprocessor 202 writes to a control register 206 to re-enable the PHY 208 that was previously disabled at block 406, in response to the automatic detection at block 716 that the corrective action was taken by the user. Flow ends at block 718.

Figure 8:
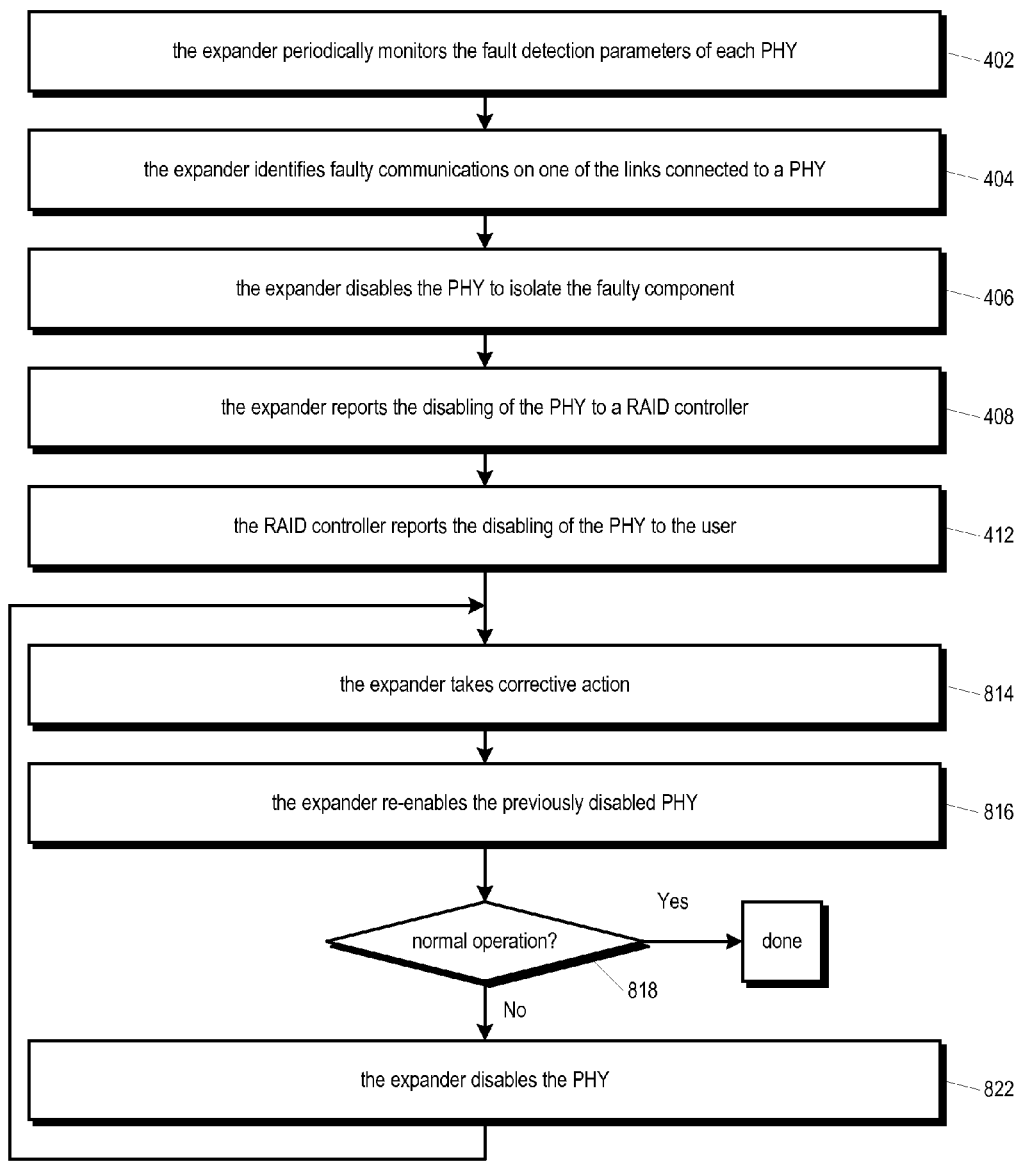

Referring now to FIG. 8, a flowchart illustrating operation of the SAS system 100 of FIG. 1 according to an alternate embodiment is shown. FIG. 8 describes operation of the SAS system 100 of FIG. 1 in which the SAS expander 102 automatically takes action to attempt to correct the faulty condition and recover communications on the previously disabled PHY 208.

Flow begins at block 402. Blocks 402 through 412 of FIG. 8 are the same as like-numbered blocks of FIG. 4 and for the sake of brevity are not described again here. Flow proceeds from block 412 of FIG. 8 to block 814.

At block 814, the microprocessor 202 automatically takes corrective action. In one embodiment, the automatic corrective action taken by the microprocessor 202 is to automatically adjust the PHY 208 analog settings (shown in FIG. 9) which may cause the SAS link 112 to start functioning properly if, for example, the cable length has been changed since the last time the PHY 208 analog settings were set. This adaptive PHY configuration is described in more detail with respect to FIGS. 9 through 14. Flow proceeds to block 816.

At block 816, the microprocessor 202 writes to a control register 206 to re-enable the PHY 208 that was previously disabled at block 406. Flow proceeds to decision block 818.

At decision block 818, the microprocessor 202 determines whether normal communications have been restored on the SAS link 112 after re-enabling the PHY 208. If so, flow ends; otherwise, flow proceeds to block 822.

At block 822, the microprocessor 202 disables the PHY 208 again. Flow returns from block 822 to block 814.

In one embodiment, the microprocessor 202 maintains a retry count threshold, and once the microprocessor 202 has performed the steps in the loop at blocks 814 to 822 a number of times that exceeds the retry threshold, the microprocessor 202 leaves the PHY 208 disabled and stops trying to automatically repair the fault until it detects an event indicating that it should re-enable the PHY 208.

In one embodiment, the microprocessor 202 increases the period of the steps performed in the loop at blocks 814 to 822 each time it disables the PHY 208 at block 822 in order to reduce the number of SAS discover processes that must be performed in response to the PHY 208 disabling/re-enabling. A management application client performs a SAS discover process to discover all the SAS devices and expander devices in the SAS domain (i.e., determining their device types, SAS addresses, and supported protocols). A SAS initiator device uses this information to determine SAS addresses to which it is able to establish connections. A self-configuring expander device uses this information to fill in its expander route table. Additionally, if there are multiple disabled PHYs 208 that need re-enabling, then the microprocessor 202 re-enables all of the disabled PHYs 208 at the same time in order to further reduce the number of SAS domain discover processes that must be performed.

Referring now to FIG. 9, a block diagram illustrating a PHY configuration setting table 226 of FIG. 2 used to perform adaptive PHY configuration according to the present invention is shown. The memory 204 stores the PHY configuration setting table 226. The table 226 includes a plurality of entries for each of a corresponding plurality of cable length ranges 902. Each entry in the table 226 includes PHY 208 analog setting 912 values that affect the quality of the signals received or transmitted by the PHY 208. Each entry includes a RX equalization field 904 value, a TX pre-emphasis, or pre-compensation, field 906 value, and a TX voltage swing field 908 value, which are referred to collectively as analog settings 912. The use of equalization, pre-emphasis, and voltage swing to improve the quality of transmitted signals is well-known. The microprocessor 202 programs the analog setting 912 values into CSRs 206 of each PHY 208 of the SAS expander 102 to control the equalization of the PHY 208 receiver, pre-emphasis of the PHY 208 transmitter, and voltage swing of the PHY 208 transmitter, respectively. The population of the table 226 and its use in performing adaptive PHY configuration are described below with respect to FIGS. 12 through 13. The embodiment shown in FIG. 9 illustrates four different entries in the table 226; however, embodiments are contemplated with different numbers of entries. Furthermore, the cable length ranges 902 may vary.

Referring now to FIG. 10, a block diagram illustrating adaptive PHY configuration counters 1002 and table indexes 1004 into the configuration setting table 226 used to perform adaptive PHY configuration according to the present invention is shown. The memory 204 stores a counter 1002 and table index 1004 for each PHY 208 of the SAS expander 102. The adaptive PHY configuration code 222 executing on the microprocessor 202 updates the counters 1002 at the end of each monitoring period based on the presence or absence of PHY events during the period, and uses the counters 1002 to determine when to automatically re-configure one or more of the PHYs 208, as described in more detail with respect to FIGS. 12 through 13 below. Additionally, the adaptive PHY configuration code 222 updates the table index 1004 for a respective PHY 208 each time it adaptively re-configures the PHY 208, as described in more detail with respect to FIGS. 12 through 13 below.

Referring now to FIG. 11, a block diagram illustrating adaptive PHY configuration thresholds 1102 and 1104 of FIG. 2 used to perform adaptive PHY configuration according to the present invention is shown. In one embodiment, the memory 204 stores individual threshold values for each PHY 208 type, which for the SAS expander 102 includes an ingress PHY 208 type and an egress PHY 208 type. An ingress PHY 208 is a PHY 208 on the side of the SAS expander 102 closest to the SAS initiator (i.e., closest to the RAID controller 104 in FIG. 1), and an egress PHY 208 is a PHY 208 on the side of the SAS expander 102 closest to the SAS target (i.e., closest to the SAS disks 106 in FIG. 1). At the end of each monitoring period, the adaptive PHY configuration code 222 executing on the microprocessor 202 compares the counter 1002 of FIG. 10 for each PHY 208 with the appropriate threshold 1102/1104 to determine when to automatically re-configure one or more of the PHYs 208, as described in more detail with respect to FIGS. 12 through 13 below. In one embodiment, the ingress PHY type threshold 1102 value is 8, and the egress PHY type threshold 1102 value is 4.

Figure 12:
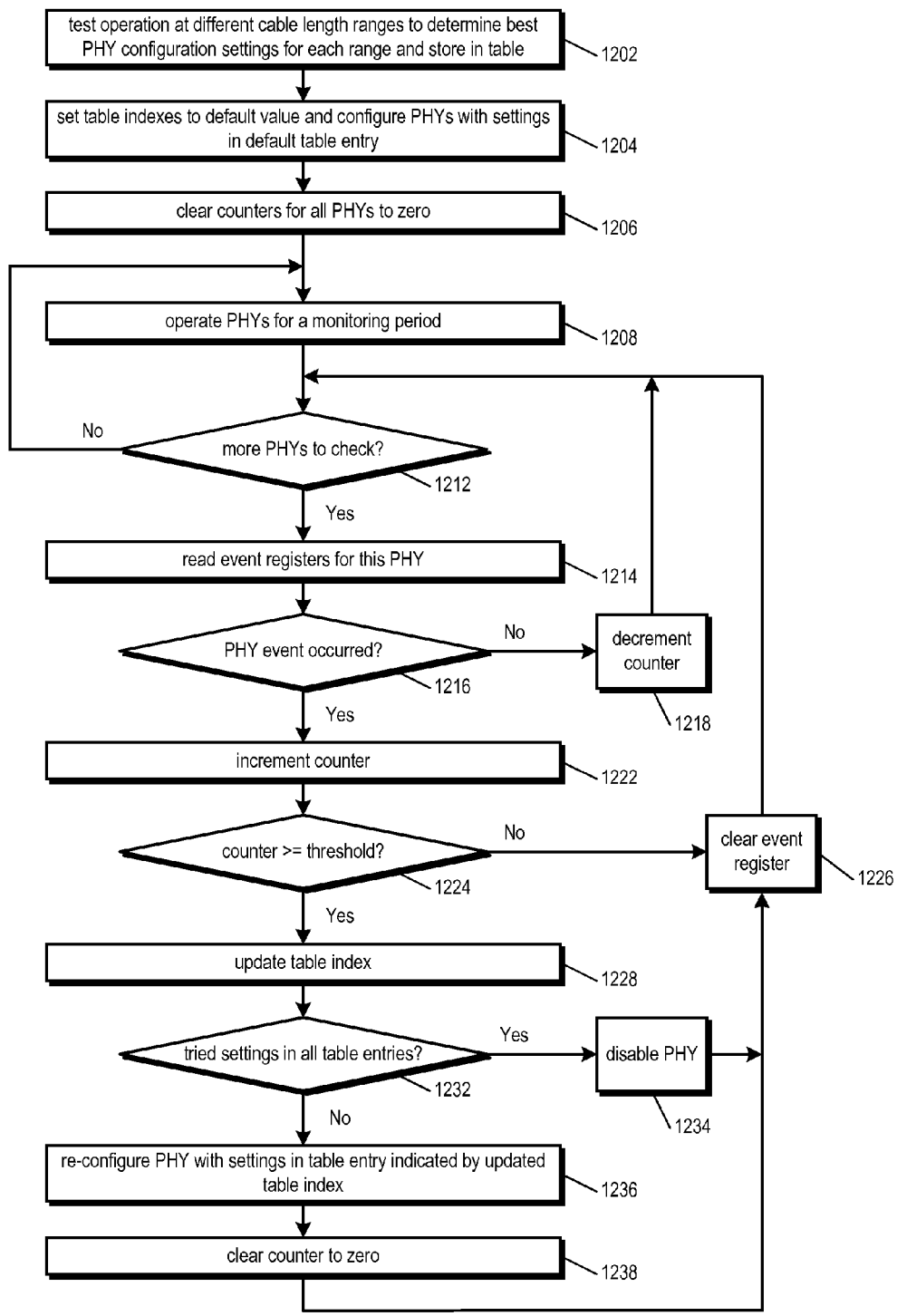
FIG. 12 is a flowchart illustrating operation of the SAS system of FIG. 1 to perform adaptive PHY configuration according to the present invention.

Referring now to FIG. 12, a flowchart illustrating operation of the SAS system of FIG. 1 to perform adaptive PHY configuration according to the present invention. Flow begins at block 1202.

At block 1202, a designer, such as the RAID controller 104 designer or SAS expander 102 designer, determines the values with which the adaptive PHY configuration setting table 226 of FIG. 2 should be populated. In one embodiment, the values in the table 226 are determined empirically by connecting a PHY 208 of the SAS expander 102 to a PHY of the RAID controller 104 or of a SAS disk 106 with different cables of varying lengths. For each cable of different length, the designer adjusts the analog settings of the SAS expander 102 PHY 208 and observes, such as with the aid of an oscilloscope, the eye mask generated during operation, i.e., during transmission of data between the SAS expander 102 and the RAID controller 104 or SAS disk 106. The designer then selects for storage into the table 226 the analog setting values 912 that generate the best eye mask. The designer observes the analog setting values 912 that appear to provide the best eye masks for various ranges of lengths of SAS cable. As an example, the designer might determine that the test data falls into four sets of analog setting values 912 that best accommodate the various cable length ranges 902. For example, the ranges may be: 1) less than 1 meter; 2) between 1 meter and 3 meters; 3) between 3 meters and 6 meters; and 4) greater than 6 meters. The analog settings values 912 are programmed into the table 226. In one embodiment, the analog settings values 912 are compiled as part of the code 222 executed by the microprocessor 202. Flow proceeds to block 1204.

At block 1204, the microprocessor 202 boots up and the initialization code 222 initializes the table index 1004 of FIG. 10 for each PHY 208 to a default value that selects the entry in the table 226 that contains the default analog settings 912 and configures each of the SAS expander 102 PHYs 208 with analog settings 912 from the default entry in the table 226. In one embodiment, the default entry in the table 226 is selected as the entry corresponding to the cable length range 902 encompassing the most common length cable used by the RAID controller 104 manufacturer to connect the enclosures 114. Flow proceeds to block 1206.

At block 1206, the initialization code 222 clears to zero the counter 1002 of FIG. 10 for each PHY 208 of the SAS expander 102. Flow proceeds to block 1208.

At block 1208, the microprocessor 202 executes the code 222 to operate the SAS expander 102 PHYs 208, i.e., to communicate with the remote PHYs 208 of the RAID controller 104, other SAS expander 102, or SAS disk 106 to which each SAS expander 102 PHY 208 is connected, for the monitoring period 372 of FIG. 3. Flow proceeds to decision block 1212.

At decision block 1212, at the end of operation during the monitoring period 372, the code 222 commences checking all the SAS expander 102 PHYs 208 to determine whether it has performed steps 1214 through 1238 for all of the PHYs 208 of the SAS expander 102. If the code 222 determines that all of the SAS expander 102 PHYs 208 have been checked, flow returns to block 1208 to operate for another monitoring period 372; otherwise, flow proceeds to block 1214.

At block 1214, the code 222 reads the PHY event registers for the current PHY 208, such as the interrupt indicators 218, counters 392, and/or states 394 of FIG. 3. In one embodiment, reading the event registers comprises reading one or more registers of the CSRs 206 that indicate the state of one or more of the interrupt indicators 218 of FIG. 3. Flow proceeds to decision block 1216.

At decision block 1216, the code 222 determines whether a PHY event occurred for the current PHY 208 during the monitoring period 372 based on the information obtained at block 1214. A PHY event is defined herein as detection by the PHY receiver of any of the following events:

1) a running disparity error (such as indicated by a disparity error interrupt 328 and/or a non-zero value of the disparity error count 304);
2) a loss of DWORD synchronization (such as indicated by a DWORD synchronization loss interrupt 334 and/or a non-zero value of the loss of DWORD synchronization count 308 and/or predetermined value of the DWORD synchronization lost state 344);

3) an elasticity buffer overflow (such as indicated by elastic store overflow interrupt 326);

4) an 8b10b code violation (such as indicated by a code violation error interrupt 332 and/or a non-zero value of the code violation count 306);

5) a CRC error (such as indicated by a non-zero value of the CRC error count 314 or the in connection CRC error count 316).

If a PHY event occurred for the current PHY 208 during the monitoring period 372, flow proceeds to block 1222; otherwise, flow proceeds to block 1218.

At block 1218, the code 222 decrements the counter 1002 associated with the current PHY 208, since no PHY event occurred during the monitoring period 372; however, the code 222 does not decrement the counter 1002 below zero. Flow returns to decision block 1212.

At block 1222, the code 222 increments the counter 1002 associated with the current PHY 208, since at least one PHY event occurred during the monitoring period 372. In one embodiment, rather than incrementing the counter 1002 by one, the code 222 increments the counter 1002 by a value greater than one, and the threshold 1102/1104 values are significantly larger. Flow proceeds to decision block 1224.

At decision block 1224, the code 222 determines whether the counter 1002 for the current PHY 208 has reached the relevant egress PHY type threshold 1102 or ingress PHY type threshold 1104 associated with the current PHY 208 type. If so, flow proceeds to block 1228; otherwise, flow proceeds to block 1226.

At block 1226, the code 222 clears the relevant event registers, such as the counters 392 or interrupt indicator registers 218, which indicated at decision block 1216 that a PHY 208 event occurred. Flow returns to decision block 1212.

At block 1228, the code 222 updates the table index 1004 of the PHY 208. In one embodiment, the table index 1004 is incremented and is wrapped back to the first entry of the table 226 if the table index 1004 value exceeds the highest index value of the table 226. Flow proceeds to decision block 1232.

At decision block 1232, the code 222 determines whether it has attempted to adaptively re-configure the PHY 208 with the settings of all the entries in the table 226. If not, flow proceeds to block 1234; otherwise, flow proceeds to block 1234.

At block 1234, the code 222 disables the PHY 208, since there appears to be a problem with the link 112 that is not remediable by adaptively configuring the PHY 208. Flow proceeds to block 1226.

At block 1236, the code 222 re-configures the PHY 208 with the analog settings 912 in the table 226 entry indicated by the entry index 1004 value that was updated at block 1228. In one embodiment, the SAS expander 102 reports the adaptive configuration performed at block 1236 similar to the manner in which the SAS expander 102 reports the disabling of a PHY described above with respect to blocks 408 and 412 of FIG. 4. Flow proceeds to block 1238.

At block 1238, the code 222 clears the counter 1002 to zero. Flow proceeds to block 1226.

Referring now to FIG. 13, a table illustrating an example of operation of adaptive PHY configuration according to FIG. 12 according to the present invention is shown. The table illustrates operation for a single PHY 208 of the SAS expander 102 of FIG. 2. The table includes a number of consecutive monitoring periods, indicated as 0 through 26, each monitoring period being the time indicated by the value stored in the monitoring period register 372 of FIG. 3. For each monitoring period, the table indicates whether a PHY event occurred according to block 1216 of FIG. 12. For each monitoring period, the table also indicates the value of the PHY's 208 counter 1002 value. In the example of FIG. 13, the PHY 208 is an egress PHY 208 type, and the egress PHY type threshold 1102 value is 4.

As shown, in monitoring period 0 no PHY event occurs so the counter 1002 value remains at its initial value of 0, according to block 1222 of FIG. 12. In monitoring period 1 a PHY event occurs so the counter 1002 value is incremented to 1, according to block 1222. In monitoring period 2 a PHY event occurs so the counter 1002 value is incremented to 2. In monitoring period 3 no PHY event occurs so the counter 1002 value is decremented to 1, according to block 1218 of FIG. 12. In monitoring period 4 a PHY event occurs so the counter 1002 value is incremented to 2. In monitoring period 5 a PHY event occurs so the counter 1002 value is incremented to 3. In monitoring period 6 a PHY event occurs so the counter 1002 value is incremented to 4. Since the egress PHY type threshold 1102 has now been reached, as determined at block 1224 of FIG. 12, the code 222 performs steps 1228 through 1238 of FIG. 12; in particular, the code 222 re-configures the PHY 208 with the analog settings 912 in the table 226 entry indicated by the updated index and clears the counter 1002 to 0. The microprocessor 202 then continues to operate the PHY 208 with the new analog settings 912 to communicate with the remote PHY to which the PHY 208 is coupled.

In monitoring period 7 a PHY event occurs so the counter 1002 value is incremented to 1. In monitoring period 8 a PHY event occurs so the counter 1002 value is incremented to 2. In monitoring period 9 a PHY event occurs so the counter 1002 value is incremented to 3. In monitoring period 10 a PHY event occurs so the counter 1002 value is incremented to 4. Since the egress PHY type threshold 1102 has now been reached again, the code 222 again performs steps 1228 through 1238 of FIG. 12 by again re-configuring the PHY 208 with the analog settings 912 in the table 226 entry indicated by the updated index and clearing the counter 1002 to 0. The microprocessor 202 then continues to operate the PHY 208 with the new analog settings 912 to communicate with the remote PHY to which the PHY 208 is coupled.

In monitoring periods 11 through 13 no PHY event occurs so the counter 1002 value remains 0. In monitoring period 14 a PHY event occurs so the counter 1002 value is incremented to 1. In monitoring period 15 no PHY event occurs so the counter 1002 value is decremented to 0. In monitoring periods 16 through 26 no PHY event occurs so the counter 1002 value remains 0.

As may be observed from FIG. 13, advantageously the SAS expander 102 operated according to FIG. 12 to adaptively re-configure the analog settings 912 of the PHY 208 until it found analog settings 912 that appear to cause the PHY 208 to reliably operate with the remote PHY, in particular with respect to the length and/or transmission properties of the SAS cable attaching the PHY 208 to the remote PHY.

Figure 14:
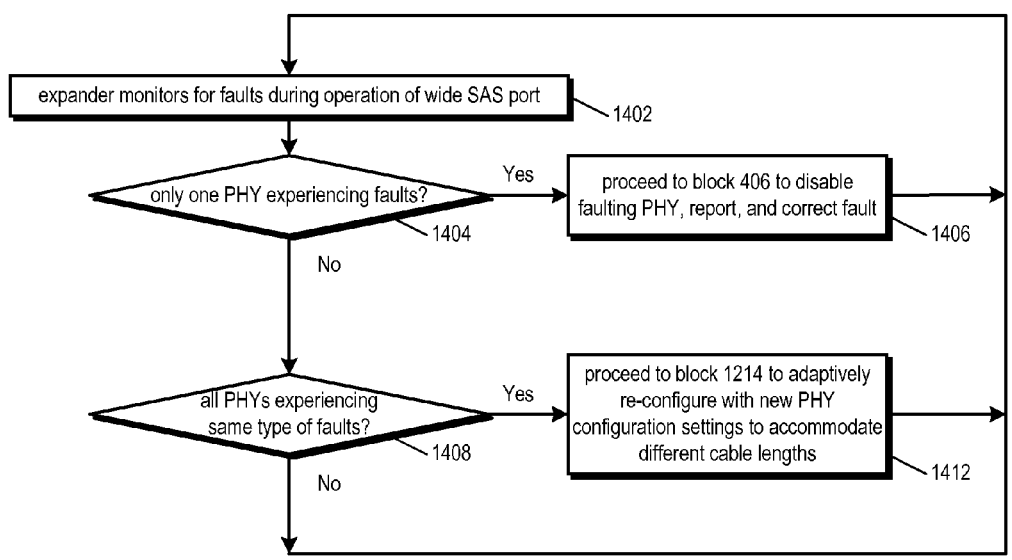
FIG. 14 is a flowchart illustrating operation of the SAS system of FIG. 1 to improve the reliability of a SAS domain including a SAS expander having a wide SAS port according to the present invention.

Referring now to FIG. 14, a flowchart illustrating operation of the SAS system 100 of FIG. 1 to improve the reliability of a SAS domain including a SAS expander 102 of FIG. 2 having a wide SAS port 216 according to the present invention is shown. Flow begins at block 1402.

At block 1402, the microprocessor 202 executes the code 222 to operate the SAS expander 102 to communicate via one of its wide ports 216 of FIG. 2 with a remote wide SAS port of the RAID controller 104, other SAS expander 102, or SAS disk 106 to which each SAS expander 102 wide port 216 is connected and monitors for faults during operation of the wide SAS port 216 in a manner similar to that described above with respect to blocks 402 and 404 of FIG. 4 and blocks 1208 through 1216 of FIG. 12. Flow proceeds to decision block 1404.

At decision block 1404, the microprocessor 202 executes the code 222 to determine whether only one of the PHYs 208 of the wide port 216 experienced faults during the monitoring period. If so, flow proceeds to block 1406; otherwise, flow proceeds to decision block 1408.

At block 1406, the microprocessor 202 executes the code 222 to effectively proceed to block 406 to disable the faulting PHY 208 and to report and correct the fault as described above with respect to one of FIGS. 4 through 8. Flow returns to block 1402.

At decision block 1408, the microprocessor 202 executes the code 222 to determine whether all of the PHYs 208 of the wide port 216 experienced the same type of fault during the monitoring period. For example, all of the PHYs 208 of the wide port 216 may have experienced one or more of the PHY receiver events discussed with respect to decision block 1216 of FIG. 12 during the monitoring period. If all of the PHYs 208 of the wide port 216 experienced the same type of fault, flow proceeds to block 1412; otherwise, flow returns to block 1402.

At block 1412, the microprocessor 202 executes the code 222 to effectively proceed to block 1214 to adaptively re-configure the PHYs 208 of the wide port 216 with new PHY configuration settings to accommodate differing cable lengths as described above with respect to FIG. 12. Flow returns to block 1402.

Although the present invention and its objects, features, and advantages have been described in detail, other embodiments are encompassed by the invention. For example, although embodiments have been described in which the PHYs are SAS PHYs, the adaptive PHY configuration embodiments may also be employed with respect to SATA PHYs. For example, the PHY configuration setting table may include, for each cable length range, separate values for SAS and SATA. Furthermore, although embodiments have been described in which the PHYs are SAS expander PHYs, the adaptive PHY configuration embodiments may also be employed with respect to SAS end device PHYs, such as SAS disk PHYs or SAS initiator PHYs, in which case a different threshold value may exist for each of these PHY types. Still further, although embodiments have been described in which the adaptively configured analog settings include equalization, pre-emphasis, and voltage swing, other analog settings that affect the ability to reliably transceive signals between the SAS expander PHY and a remote PHY are contemplated.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A Serial-Attached-SCSI (SAS) expander, comprising:
  a plurality of SAS PHYs, each for coupling to a SAS cable for communication with a respective remote PHY;
  a memory, configured to store:
    a counter associated with each of said plurality of PHYs; and
    a table of PHY configuration settings, each entry in the table having different PHY configuration setting values; and
  a microprocessor, coupled to said memory and to said plurality of PHYs, configured to, for each of said plurality of PHYs:
    (a) configure the PHY with settings of an entry of the table;
    (b) clear the counter associated with the PHY;
    (c) operate the PHY to communicate with the remote PHY for a monitoring period, after configuring the PHY and clearing the counter;
    (d) increment the counter when the PHY detects a PHY event during the monitoring period, and otherwise decrement the counter;
    (e) repeat steps (c) and (d) unless the counter rises above a threshold; and
    (f) when the counter rises above the threshold, repeat steps (a) through (e),
      wherein the microprocessor performs step (a) with the settings of a different entry of the table.

2. The SAS expander of claim 1, wherein said PHY event comprises detection of a running disparity error by said PHY.

3. The SAS expander of claim 1, wherein said PHY event comprises detection of a loss of DWORD synchronization by said PHY.

4. The SAS expander of claim 1, wherein said PHY event comprises detection of an overflow of an elasticity buffer of the PHY by said PHY.

5. The SAS expander of claim 1, wherein said PHY event comprises detection of an 8b10b code violation by said PHY.

6. The SAS expander of claim 1, wherein said PHY event comprises detection of a CRC error by said PHY.

7. The SAS expander of claim 1, wherein the PHY configuration setting of each entry of the table includes a receiver equalization setting.

8. The SAS expander of claim 1, wherein the PHY configuration setting of each entry of the table includes a transmitter pre-emphasis setting.

9. The SAS expander of claim 1, wherein the PHY configuration setting of each entry of the table includes a transmitter voltage swing setting.

10. The SAS expander of claim 1, wherein the microprocessor is further configured to, for each of said plurality of PHYs:
  (g) repeat steps (a) through (f) until it has performed steps (a) through (f) with all the entries of the table; and
  (h) disable the PHY when it has performed steps (a) through (f) with all the entries of the table.

11. A method for adaptively configuring a Serial-Attached-SCSI (SAS) PHY to accommodate varying lengths of a cable coupling the PHY to a remote PHY, the method comprising:
  (a) configuring the SAS PHY with settings of an entry of a table of PHY configuration settings, each entry in the table having different PHY configuration setting values;
  (b) clearing a counter;
  (c) operating the PHY to communicate with the remote PHY for a monitoring period, after said configuring the PHY and said clearing the counter;
  (d) incrementing the counter when the PHY detects a PHY event during the monitoring period, and otherwise decrementing the counter;
  (e) repeating steps (c) and (d) unless the counter rises above a threshold; and
  (f) when the counter rises above the threshold, repeating steps (a) through (e),
    wherein step (a) is performed with the settings of a different entry of the table.

12. The method of claim 11, wherein said PHY event comprises said PHY detecting a running disparity error.

13. The method of claim 11, wherein said PHY event comprises said PHY detecting a loss of DWORD synchronization.

14. The method of claim 11, wherein said PHY event comprises said PHY detecting an overflow of an elasticity buffer of the PHY.

15. The method of claim 11, wherein said PHY event comprises said PHY detecting an 8b10b code violation.

16. The method of claim 11, wherein said PHY event comprises said PHY detecting a CRC error.

17. The method of claim 11, further comprising:
empirically testing to determine an optimal configuration setting for different respective cable length ranges of the table entries, prior to said configuring the SAS PHY.

18. The method of claim 11, wherein the PHY configuration setting of each entry of the table includes a receiver equalization setting.

19. The method of claim 11, wherein the PHY configuration setting of each entry of the table includes a transmitter pre-emphasis setting.

20. The method of claim 11, wherein the PHY configuration setting of each entry of the table includes a transmitter voltage swing setting.

21. The method of claim 11, further comprising:
(g) repeating steps (a) through (f) until steps (a) through (f) have been performed with all the entries of the table; and
(h) disabling the PHY when steps (a) through (f) have been performed with all the entries of the table.

22. A Serial-Attached-SCSI (SAS) expander, comprising:
a wide SAS port, for coupling to a SAS cable for communication with a remote wide SAS port, said wide SAS port comprising a plurality of SAS PHYs;
a memory, configured to store a plurality of different PHY configuration settings; and
a microprocessor, coupled to said memory and to said wide SAS port, configured to:
monitor for faults during operation of the wide SAS port;
adaptively re-configure the plurality of SAS PHYs with a different one of said plurality of PHY configuration settings, in response to detecting that all of the plurality of SAS PHYs of the wide SAS port are experiencing the same type of fault, wherein said plurality of different PHY configuration settings comprise empirically tested optimal configuration settings for different ranges of lengths of a cable coupling the wide SAS port to a remote wide SAS port; and
disable one of the plurality of SAS PHYs of the wide SAS port, in response to detecting that only said one of the plurality of SAS PHYs is experiencing faults.

23. A method for improving the reliability of a Serial-Attached-SCSI (SAS) domain including a SAS expander having a wide SAS port comprising a plurality of SAS PHYs, the method comprising:
monitoring for faults during operation of the wide SAS port;
adaptively re-configuring the plurality of SAS PHYs with new PHY configuration settings, in response to detecting that all of the plurality of SAS PHYs of the wide SAS port are experiencing the same type of fault, wherein said new PHY configuration settings comprise empirically tested optimal configuration settings for different ranges of lengths of a cable coupling the wide SAS port to a remote wide SAS port; and
disabling one of the plurality of SAS PHYs of the wide SAS port, in response to detecting that only said one of the plurality of SAS PHYs is experiencing faults;
wherein said monitoring, said adaptively re-configuring, and said disabling are all performed by the SAS expander.

* * * * *